INVENTORS
Olin S. Lewis
Troy V. Morran

ATTORNEYS

Jan. 7, 1969

O. S. LEWIS ET AL 3,419,990

FISHING APPARATUS

Filed March 27, 1967

INVENTORS
Olin S. Lewis
Troy V. Morran

BY

ATTORNEYS

United States Patent Office 3,419,990
Patented Jan. 7, 1969

3,419,990
FISHING APPARATUS
Olin S. Lewis, Rte. 3, Seagoville, Tex. 75159, and
Troy V. Morran, Rte. 2, Box 144, Mesquite, Tex.
75149
Filed Mar. 27, 1967, Ser. No. 626,165
U.S. Cl. 43—6.5        11 Claims
Int. Cl. A01k 79/00

ABSTRACT OF THE DISCLOSURE

A fishing apparatus having a pair of intermeshing gear-like members mounted on a base member for resiliently gripping and pulling a trotline and moving a boat therealong for servicing the trotline. A torus line guide and a guide post are mounted on the base and on opposite sides of the gear-like members for guiding the trotline therethrough. One of the gear-like members is driven by a hand crank and the other gear-like member is mounted for selective engagement therewith to facilitate removing or attaching the trotline. A clamp member is provided for attachment of the apparatus to a boat.

---

This invention relates to new and improved fishing apparatus useful in running trotlines.

An important object of the invention is to provide an improved fishing apparatus for drawing a trotline out of the water for rebaiting and removing the fish caught on the hooks of the droplines or trots of the main line of the trotline.

A further object of the invention is to provide means in an apparatus of the character described for preventing the hooks on the trots or droplines from becoming snagged or engaged with the boat or other objects during the movement of the trotline through the apparatus.

Another object of the invention is to provide a device of the character described wherein a positive resilient gripping and pulling engagement with the main line of the trotline is obtained, whereby a single fisherman may draw a boat through the water by means of the apparatus and at the same time lift the line and any fish caught on the hooks thereon into the boat without the necessity of having a helper or a boat operator.

Another object is to provide an apparatus of the character described which is readily attachable to and removable from a fishing boat, and which is provided with means permitting ready engagement of the main line of the trotline in the gripping pull mechanism of the apparatus.

A particular object of the invention is to provide in an apparatus of the character described means for guiding the main line of the trotline through the apparatus alongside the boat so that the line is passed without entangling engagement of the hooks with the boat or other objects in the boat so that the line will pass readily through the apparatus.

Still another object of the invention is to provide an apparatus of the character described wherein the means for gripping and moving the line is provided with a crank mechanism providing a mechanical advantage to the user in lifting the line and moving the boat by means of the line.

Additional objects and advantages of the invention will be readily apparent from the reading of the following description of a device constructed in accordance with the invention, and reference to the accompanying drawings thereof, wherein.

Figure 1:
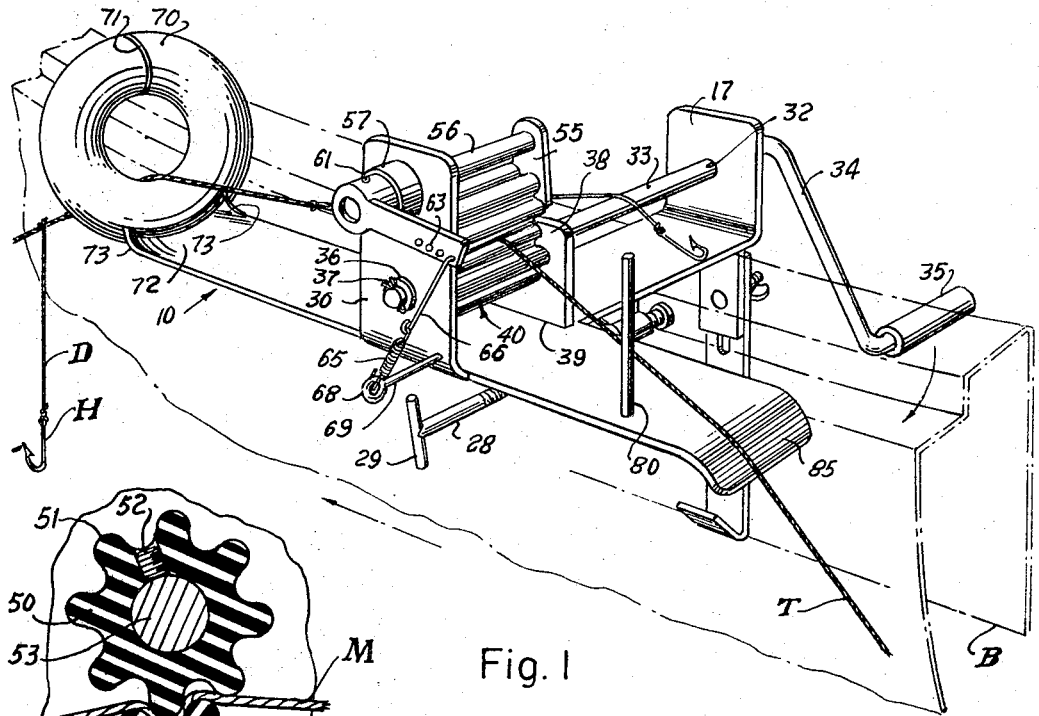
FIGURE 1 is an isometric view of a fishing apparatus constructed in accordance with the invention showing the same attached to a fragment of a boat, and having a trotline being run therethrough.
Figure 5:
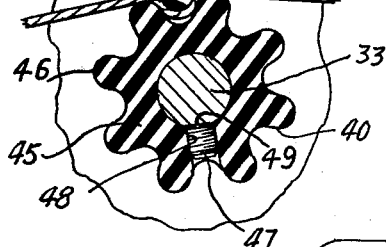

In the drawings, the numeral 10 designates generally a fishing apparatus constructed in accordance with the invention and showing the same releasably secured to the side or gunwale of a boat B for supporting the apparatus alongside the boat in order that a trotline T may be drawn through the apparatus for removing fish from the hooks H of the trots or drop lines D secured to the main line of the trotline, the boat being drawn through the water by the apparatus.

The fishing apparatus includes an elongate substantially horizontal base plate 15 having a lateral extension plate or supporting arm 16 formed integral therewith and extending inwardly from the plate over the upper edge of the gunwale of the boat for supporting the base plate on the gunwale. The inner end of the inwardly extending arm or plate is turned upwardly at right angles to the arm to provide a bearing support member 17 for a purpose to be hereinafter more fully explained.

An angular connecting member 18 is secured, as by welding or otherwise, at 19 to the inner end of the supporting arm 16 and extends downwardly therefrom and is provided with an opening in which a threaded stud bolt 20 is welded or otherwise secured. The stud bolt projects from the downwardly extending arm 20 of the angle member and is adapted to engage the slot of a slotted catch or hook member 22 having an upturned hook 23 at its lower end adapted to engage under the inner frame portion of the gunwale of the boat for securely connecting the arm and base member to the gunwale. A wing nut 24 is threaded on the screw or bolt 21 and clamps the catch or hook member 22 to the depending arm of the connecting member at the proper position to engage and securely hold the inner end of the lateral supporting arm 16 in place on the gunwale. A depending rib 25 is welded or otherwise secured along its upper end as at 26 to the underside of the inwardly extending support arm or plate 16, and is provided with a threaded sleeve 27 through which an adjusting clamp screw or fastening screw 28 is threaded. The clamping screw has a swivel head 28a on its inner end and a T-shaped handle 29 on its outer end whereby the clamping screw may be adjusted in position with respect to the sleeve 27 to bring the swivel 28a into tight gripping engagement with the outer portion of the gunwale of the boat to positively hold the fishing apparatus 10 in place thereon.

An upturned outer bearing arm or support member 30 is formed integral with or welded to the outer edge of the base member 15 and is disposed in alignment with the inwardly extending support arm 16 and the upwardly projecting bearing support member 17 at the inner end of such arm. Axially aligned apertures 31 in the outer arm 30 and 32 in the inner support member 17 are adapted to receive a shaft 33 of a crank member 34 having a handle 35 on the outer end thereof by means of which a gripping assembly 40 for moving the trotline is operated. A washer 36 and cotter key or other securing member 37 are secured on the outer end of the crankshaft for holding the same in place in the openings in the bearing supports 17 and 30. An intermediate bearing support 38 having an aperture therein in alignment with the apertures 31 and 32 of the other bearing supports is welded or otherwise secured as at 39 to the inner edge of the base plate 15 and is disposed in parallel spaced relationship with the outer bearing support 30 and the inner bearing support 17.

Figure 2:
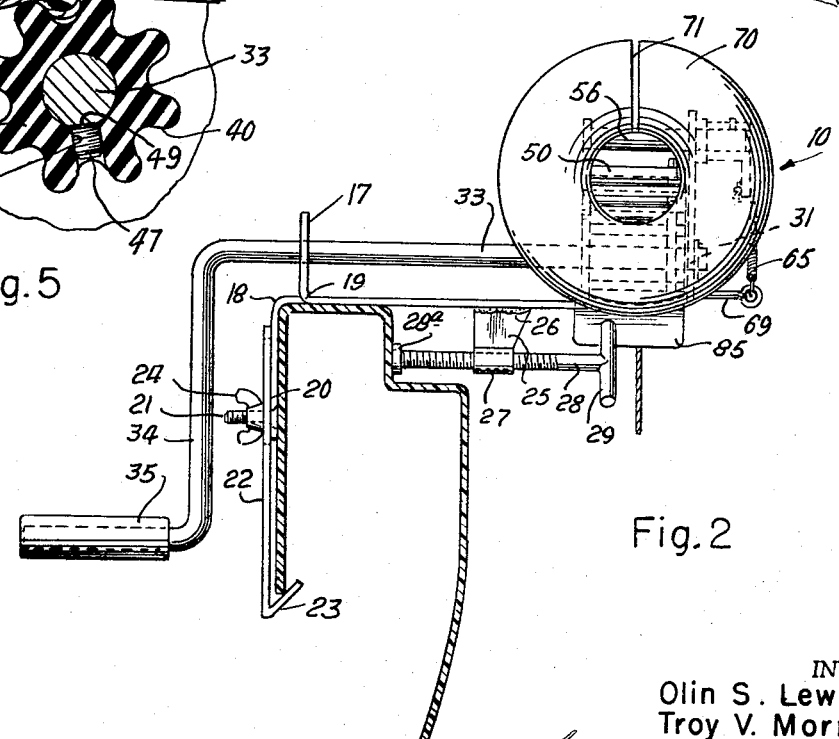
FIGURE 2 is an enlarged end view in elevation of the fishing apparatus, showing the same connected to the boat.
Figure 4:
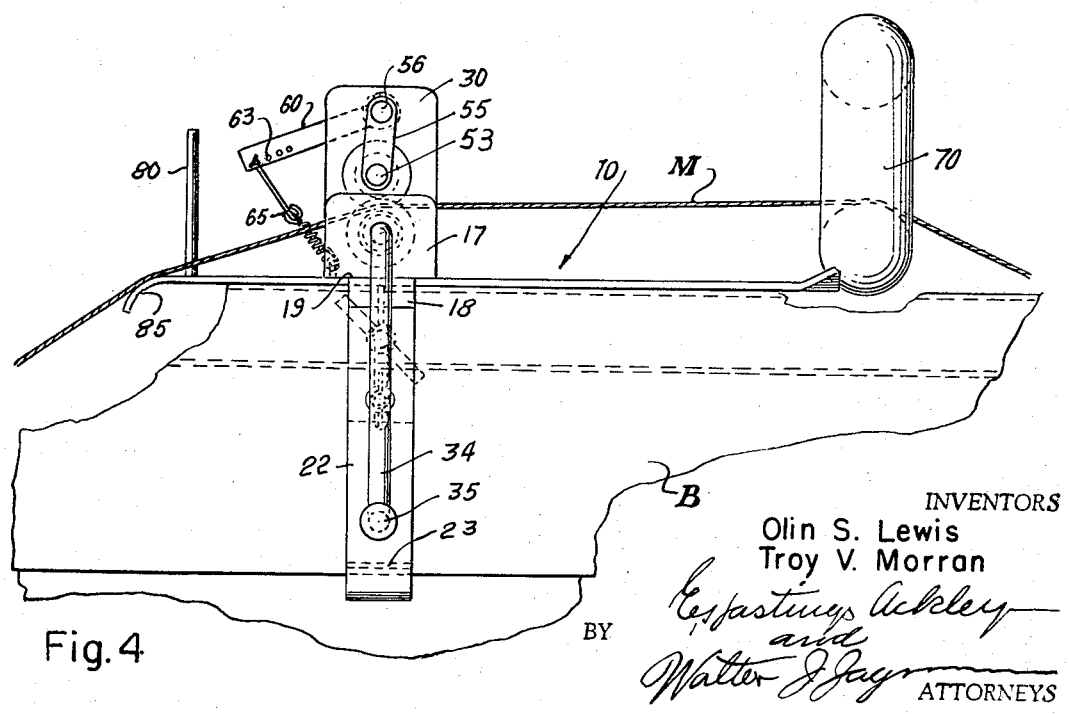
FIGURE 4 is a view in elevation of the inner or operator side of the apparatus attached to the boat and showing the line passing therethrough; and, FIGURE 5 is an enlarged fragmentary vertical sectional view taken on the line 5—5 of FIGURE 3 showing the intermeshing gripping drive means.

A lower gripping or driving gear 45 is secured on the shaft 33 and disposed between the outer bearing support 30 and the intermediate bearing support 38. The gear is preferably formed of a plastic or fibrous material and is shown as being formed with eight rounded teeth 46, whereby the teeth may engage the main line M of the trotline T without injury. A set screw 47 is threaded through an aperture 48 in the gear into engagement with a flat surface 49 on the crankshaft 33, whereby rotation of the crankshaft rotates the gear 45. An upper gripping or driving gear 50 also formed of a plastic or fibrous material and having rounded teeth 51 thereon corresponding in number and shape to those of the lower gear 45 is secured by a set screw 52 on a shaft 53 which is rotatably carried on a swingable crank or idler arm 55 welded or otherwise securely fixed to the inner end of a pivot shaft 56 which is rotatably supported in a swivel bearing 57 mounted on the upper end of the upstanding outer bearing support arm 30. The shaft 56 extends through an aperture 58 in the arm and the bearing 57, and is rotatable in such aperture by means of a swingable tension regulating arm 60 secured by a set screw 61 to the outer end of the pivot shaft 56. The regulating arm 60 has a plurality of apertures 63 in its outer end and a spring 65 is connected by a hook 66 to the arm, the hook being engaged in one of the apertures of the arm 60 and supported at its other end in the eye 68 of the projecting rod 69, welded or otherwise suitably secured to the lower portion of the upstanding bearing support 30 carried by the base member. Thus, a downward force is applied to the arm 60 by the spring biasing the swingable crank or idler arm 55 carrying the upper gear member 50 thereon downwardly to move the upper gear member into meshing engagement with the lower gear 45 for gripping the main line of the trotline therebetween. The lower end of the idler arm 55 is shorter than the radius of the upper gear member, and is so spaced from the upper end of the intermediate support member 38 as shown in FIGURES 2 and 4, whereby the main line of the trotline may be inserted between the gears without difficulty. The spring biasing the idler arm 55 downwardly to press the upper gear 50 into meshing engagement with the lower gear 45 determines the force with which the main line M of the trotline is engaged between the teeth of the gear members. Also, the resilient spring mounting of the upper gear member permits that upper member to move upwardly away from the lower gear member 45 when knots and other enlargements on the main line M pass between the gear members. The crank arm 55 may thus be turned to turn the lower gear member and so turn the upper gear member and draw the main line of the trotline between the two gear members.

Figure 3:
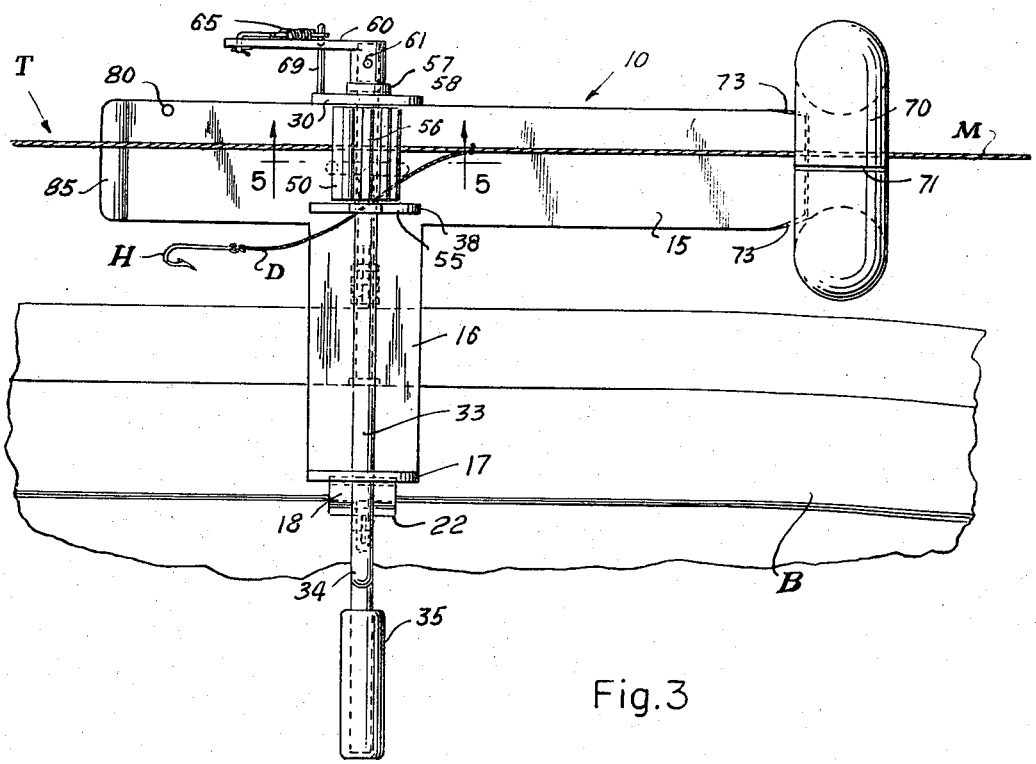
FIGURE 3 is a top plan view of the fishing apparatus showing the same attached to the boat.

A guide member 70 preferably in the form of a torus having a diagonal slot 71 formed therein is secured as by welding or otherwise to the forward end 72 of the base member 15. If desired, the slot or opening in the torus may be formed by shaping the torus in a partial helix with the adjacent free ends overlapping. Upturned corner edges 73 of the base member provide means for a better support of the torus in its vertical position with respect to the plane of the upper surface of the base member 15. It will be seen, in FIGURES 3 and 4, that the torus is disposed at substantially a right angle to the plane of the base member and that the main line M of the trotline will pass through the opening in the center of the torus to the gripping means 40. Obviously, due to the rounded shape of the torus 70, hooks and fish, if not too large, will pass through the opening of the torus to the gripping means. If the hooks are unbaited, bait may be applied thereto, or if fish are caught on the hooks, the drop lines or trots D with the fish thereon may be passed through the aperture 71 in the torus and the fish removed and the hooks rebaited. The drop line or trot will readily pass between the gears and between the lower end of the idler arm 55 and the upper end of the intermediate support member 38.

A rear guide post 80 is secured to the base member on the opposite side of the gripping means from the torus and provides for maintaining the trotline in longitudinally guided relationship with the base plate 15 during its movement through the fishing apparatus. The rear end of the base plate is curved or turned downwardly as shown at 85 so that the trotline may pass downwardly from the gripping means back into the water as shown in FIGURES 1 and 4. The guide post 80, together with the torus 70 provides for a straight guided movement of the main line of the trotline through the fishing apparatus, so that the line will not become tangled with the boat or other articles. The hooks will pass through the space between the idler arm 55 and the intermediate support 38 and may be rebaited if necessary, or fish may be removed therefrom and the hooks rebaited, as has been explained. It is also believed obvious that a second torus identical to the torus 70 may be used instead of the post 80 to guide the line at the rear end of the base, and that such structure would provide for movement of the line through the fishing apparatus in either longitudinal direction.

Obviously, the device provides for picking up the trotline at any point in the length of the line and running a portion thereof without the necessity of going to the end of the line to begin. Also, the gripping pull means provides for drawing the boat along by turning the crank to turn the gears and pull the boat by means of the trotline, whereby the user of the device may draw himself and his boat along the length of the trotline to rebait the hooks or remove fish as desired.

It will also be seen that the device provides for a positive gripping engagement of the main line of the trotline between the gear gripping means which were resiliently biased together and which are provided with rounded teeth which intermesh to securely grip the line without damaging the same, and yet the meshing gears, being resiliently biased together, permit passage of knots or other enlargements of the line therebetween without damage.

It will also be seen that the torus guide member prevents catching of the hooks on the boat or on the fishing apparatus, and that the drop lines or trots may be passed through the apparatus without interference or entanglement therewith.

It will also be seen that the device is readily attachable to and removable from the gunwale of the boat.

What is claimed and desired to be secured by Letters Patent is:

1. A fishing apparatus including: base means releasably securable to a boat; gripping pull means carried by said base means and including a pair of intermeshing gear-like members engageable with a main line of a trotline for drawing the line through the gripping pull means; and guide means on the base means for guiding the line in its movement through the gripping pull means.

2. Fishing apparatus of the character set forth in claim 1 wherein said gripping pull means includes: means resiliently biasing together said gear-like members for gripping the main line of the trotline therebetween; and means on said base member for driving at least one of said gear-like gripping members to cause rotation thereof for moving the main line of the trotline therethrough.

3. A device of the character set forth in claim 2, wherein the means for driving one of the gear-like gripping members includes: an elongate crank arm having a greater lever arm than the diameter of the said gear-like gripping member.

4. A device of the character set forth in claim 1 wherein the guide means includes a torus member carried by the base member and disposed transversely of the line of movement of the trotline through the gripping pull means for guiding the trotline into the gripping pull means.

5. A device of the character set forth in claim 1 wherein the guide means includes: a torus member having an opening for removably inserting the trotline thereinto; and a guide post on the base member on the opposite side of the gripping pull means from the torus member.

6. A fishing apparatus of the character set forth in claim 1 wherein the pair of gear-like members include: a lower gear-like gripping member and an upper gear-like gripping member, said members each having rounded teeth projecting therefrom and adapted to intermesh to grip the main line of the trotline therebetween; means resiliently biasing the upper gear-like member into meshing and inner engagement with the lower gear-like member for resiliently gripping the main line of the trotline therebetween; and means for movably mounting said upper gear-like member with respect to said lower gear-like member for supporting the gear-like member spaced from the lower gear-like member whereby the trotline may be inserted and removed.

7. A device of the character set forth in claim 1 including: means for mounting the base member on the boat comprising an adjustable catch member engageable below the gunwhale of the boat interiorly of the gunwale of the boat and a clamping member for adjustably fixing the catch member to the side of the boat.

8. A fishing apparatus including, supporting base means having means thereon for releasably securing the same to a boat; gripping pull means disposed substantially centrally of said base means and comprising: upstanding support means on said base means, a drive shaft journaled in said support means and having a crank at one end for turning said drive shaft, a first gear-like drive member mounted on said drive shaft, an idler shaft disposed on said support means above said drive shaft and in vertically spaced parallel alignment therewith, an upper gear-like driven member for intermeshing with said first gear-like drive member, a swingable arm mounted on said idler shaft having a supporting shaft on the swingable end thereof in spaced parallel relationship to said drive shaft for swingably supporting said upper gear-like drive member in parallel relationship to said first gear-like drive member and in position to intermesh therewith, an elongate lever arm on said upper idler shaft for turning said idler shaft to swing said swingable arm carrying said upper gear-like driven member into and out of intermeshing engagement with said first gear-like drive member, resilient means adjustably connected with said lever arm and said base means for applying a biasing force to said idler shaft and said swingable arm carried thereby to bias said upper gear-like driven member into meshing engagement with said first gear-like drive member for gripping a fishing line therebetween; and guide means on the base means for guiding the fishing line in its movement through the gripping pull means.

9. A device of the character set forth in claim 8 wherein the guide means comprises: guide members disposed on said base member on opposite sides of said gripping pull means and engageable with the fishing line to guide the line longitudinally through the gripping pull means.

10. A device of the character set forth in claim 9 wherein one of the guide means comprises: a torus member having an opening therein for removably receiving a fishing line into the opening of the torus member, said torus member being disposed on the forward end of the base member at a point spaced from the gripping pull means.

11. A device of the character set forth in claim 10 wherein: the other guide means comprises an upstanding post mounted on the base means on the opposite side of said gripping pull means from said torus member and spaced from said gripping pull means sufficiently to assist the torus member to guide the line through the gripping pull means; and a downturned lip is provided on the base means outwardly of the post away from the gripping pull means.

References Cited

UNITED STATES PATENTS

| 1,175,602 | 3/1916 | Chidley | 43—27.4 |
| 3,069,799 | 12/1962 | Puretic | 43—8 |

WARNER H. CAMP, *Primary Examiner.*

U.S. Cl. X.R.

43—27.4